United States Patent [19]

Van Leirsburg

[11] 4,409,190

[45] Oct. 11, 1983

[54] EXTRACTING COBALT FROM SPENT HYDROPROCESSING CATALYSTS WITH CYANIDE

[75] Inventor: Dean A. Van Leirsburg, Petaluma, Calif.

[73] Assignee: Chevron Research Company, San Francisco, Calif.

[21] Appl. No.: 422,815

[22] Filed: Sep. 24, 1982

[51] Int. Cl.$^3$ .................... C22B 3/00; C01G 51/00
[52] U.S. Cl. .................................................. 423/150
[58] Field of Search ............................................ 423/150

[56] References Cited

U.S. PATENT DOCUMENTS

| | | | |
|---|---|---|---|
| 2,662,811 | 12/1953 | Thomsen | 423/32 |
| 3,148,155 | 9/1964 | Schwartz | 252/413 |
| 3,567,433 | 3/1971 | Gutnikov | 423/150 |

FOREIGN PATENT DOCUMENTS

| | | | |
|---|---|---|---|
| 49-8491 | 1/1974 | Japan | 423/150 |
| 49-13095 | 2/1974 | Japan | 423/150 |

*Primary Examiner*—Brian E. Hearn
*Attorney, Agent, or Firm*—D. A. Newell; S. R. LaPaglia; C. L. Hartman

[57] ABSTRACT

A process is disclosed for recovery of cobalt from spent catalyst particles. The particles are roasted, leached with an ammonia/ammonium salt leach solution and then leached with a cyanide ion leach solution.

3 Claims, 2 Drawing Figures

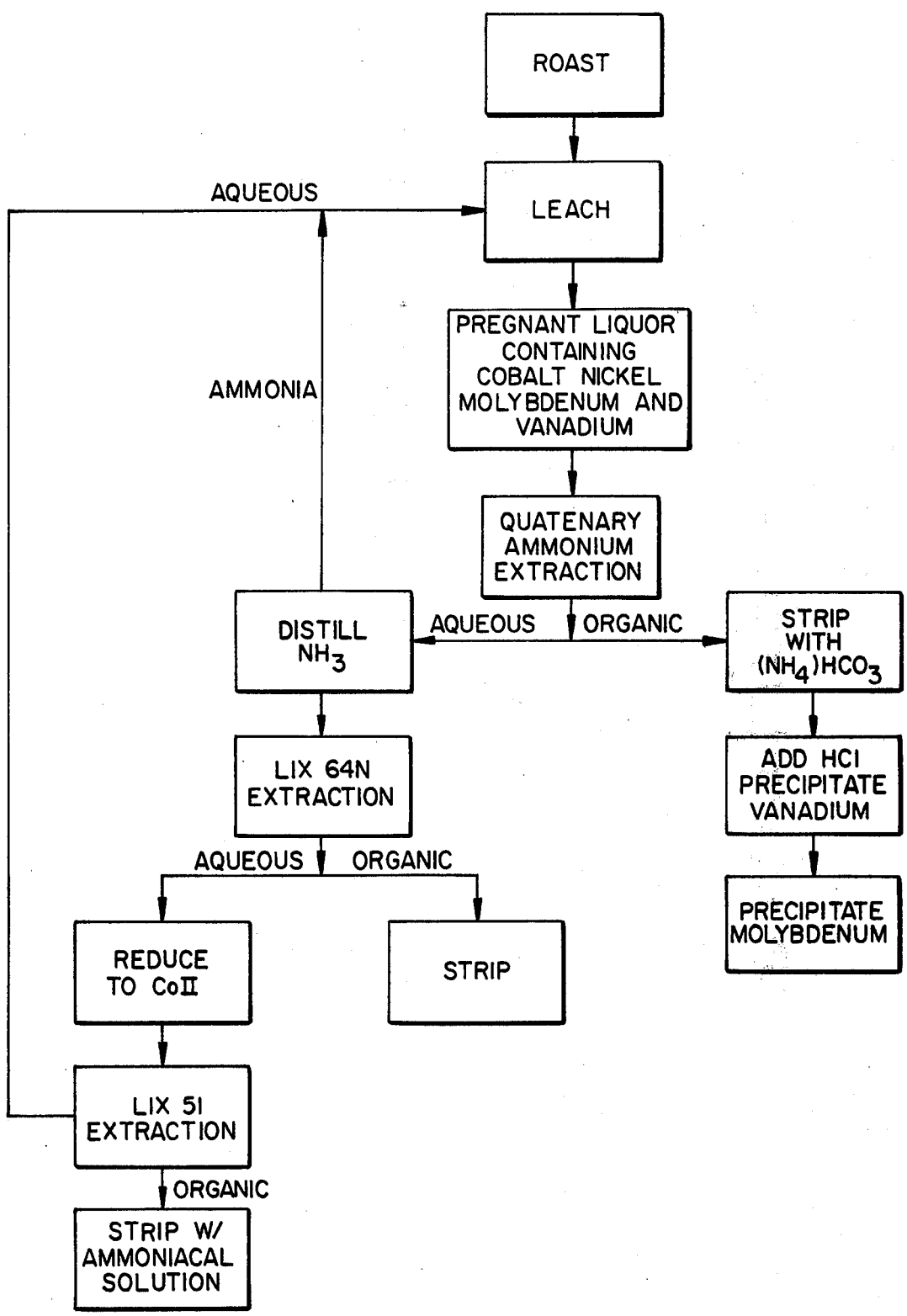
FIG._1.

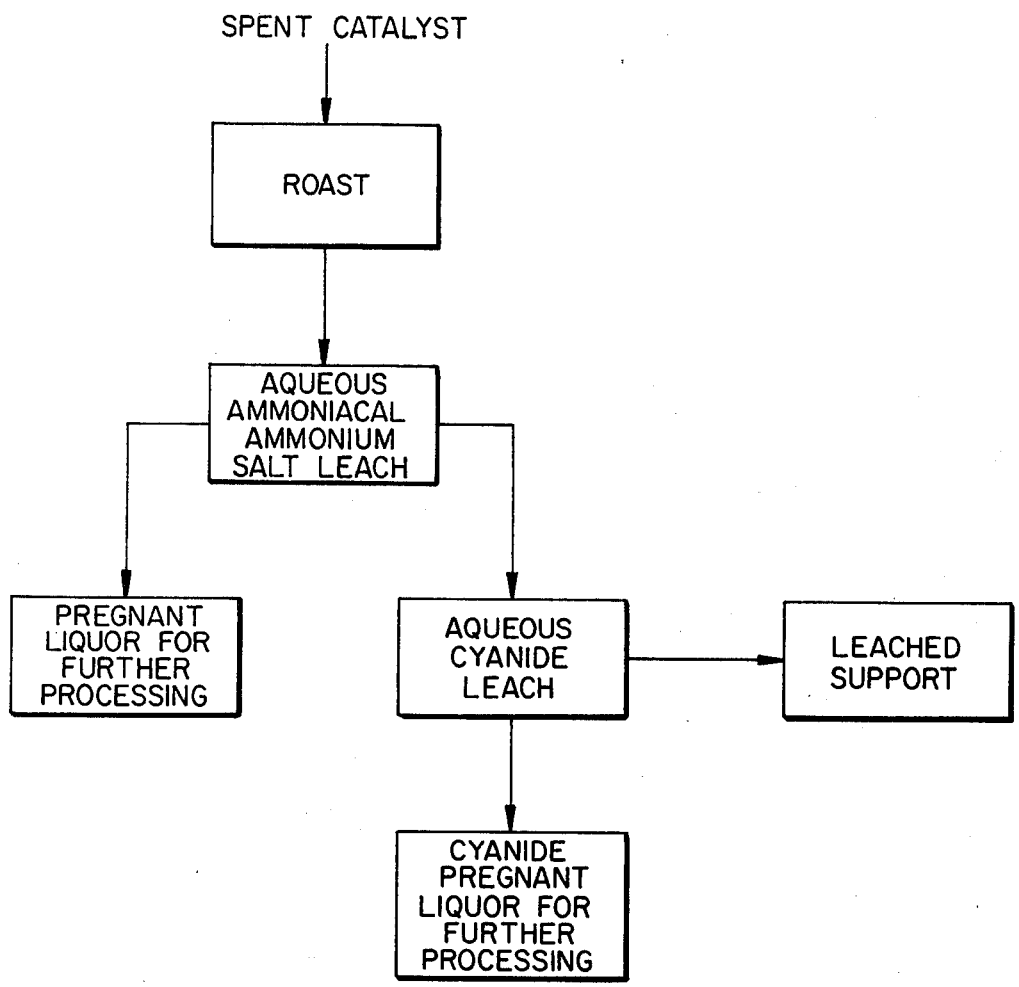
FIG._2.

EXTRACTING COBALT FROM SPENT HYDROPROCESSING CATALYSTS WITH CYANIDE

BACKGROUND OF THE INVENTION

This invention relates to improved methods for extracting cobalt from hydroprocessing catalysts.

In processing hydrocarbonaceous feedstocks, the feedstocks are frequently contacted with hydroprocessing catalysts and molecular hydrogen to hydrogenate various molecules in the feedstock, producing products with different properties than the original feedstock. The catalysts contacted generally contain Group VI-B catalytic metals and a Group VIII transition metal supported on a solid inorganic oxide support. Typical Group VI-B metals include molybdenum and tungsten. A particularly common Group VIII metal component is cobalt. Inorganic supports frequently include alumina or alumina and silica mixtures, although they may be clays or mixtures of other inorganic oxides including titanium, magnesia, boria and the like. As these catalysts are used, they become less active until they reach a point of deactivity where they must be replaced with new catalysts to maintain the desired product quality. Such deactivated catalysts are herein defined as "spent catalysts."

The spent catalyst which is removed from service still contains the valuable catalytic metals, in particular molybdenum and cobalt. It may as well contain other metals, particularly if the catalyst has been used to process crude oils or residual oils. In particular, it may contain amounts of iron, nickel and vanadium removed from the feedstock. It is desirable that the catalytic metals on the catalyst particles be removed and recycled to make new catalyst particles that have renewed activity. To do this, the metals must be removed from the support and recycled.

A variety of processes are known to remove metals from spent catalysts. One particularly good process is leaching the spent catalyst with any of a variety of liquids, primarily aqueous solutions containing various leaching agents. One particularly refractory metal towards typical leaching conditions used during the leaching of hydroprocessing catalysts is cobalt. Cobalt yields are typically quite low, although the catalyst may contain up to several weight percent cobalt.

Cobalt is a particularly valuable strategic metal and is a frequent component of hydroprocessing catalysts where it is used in relatively large amounts. A steady source of cobalt is therefore of great interest to catalyst manufacturers and the recycling of cobalt from spent hydroprocessing catalysts, which contain other metals as well, is therefore highly attractive as a source of cobalt for the manufacture of new hydroprocessing catalysts. Unfortunately, cobalt refractory towards conventional leaching techniques that extract other metals on the catalyst in high yield.

It has been discovered that cobalt containing hydroprocessing catalysts can be leached with an aqueous solution of cyanide to improved yields of cobalt recovered, after the particles have been leached by an aqueous ammonia/ammonium salt leach.

SUMMARY OF THE INVENTION

A process is provided which improves the amount of cobalt leached from spent hydroprocessing catalyst particles. The particles are first roasted to remove carbonaceous and sulfur residues at a temperature of between 400° C. and 600° C. The particles are then sequentially leached firstly with an aqueous solution of ammonia and an ammonium salt and secondly with an aqueous cyanide solution. The cyanide ion is removed and the aqueous solution of cobalt ion is processed to isolate cobalt.

BRIEF DESCRIPTION OF THE DRAWINGS

FIG. 1 shows an overall flow scheme using the process of this invention.

FIG. 2 shows the details of a leach flow scheme of this invention.

DETAILED DESCRIPTION OF THE PREFERRED EMBODIMENTS OF THE INVENTION

Catalyst particles freshly removed from hydroprocessing service are roasted under conditions so that the temperature of the particles does not exceed 400° C. to 600° C. Temperature control can be accomplished by controlling the amount of oxygen that goes into the roasting oven by dilution of the oxygen containing gas, usually air, with an inert gas such as nitrogen. The roasted catalyst particles will typically lose between about 10 and 15 percent of their weight as carbonaceous residues and sulfur residues are oxidized and escape into the atmosphere. The freshly roasted spent catalyst contains the support material, typically alumina or a mixture of alumina and another refractory inorganic oxide, e.g., alumina/silica; catalytic metals, typically cobalt and molybdenum or tungsten; and metals that have been removed from contaminated feedstocks, typically iron, nickel and vanadium. It will be appreciated that cobalt is a frequent component of hydroprocessing catalysts used in a variety of different services, for example, hydrocracking, reforming, and hydrofining. In many of these processes, the catalyst should never come in contact with a feed containing metals, and therefore the spent catalyst particles will not contain contaminant metals. Since the low metal feeds tend not to deactivate catalysts as rapidly as high metal feeds which therefore require more frequent changing, the typical spent catalyst for the operation of this invention will contain some amount of contaminating metals.

The freshly roasted catalyst particles are leached with an aqueous solution containing ammonia and an ammonium salt. Typical leach solutions contain 2 molar ammonia [$NH_3(aq)$] and 1 molar ammonium [$NH_4^+(aq)$] from an ammonim salt, preferably the sulfate or carbonate salt. The aqueous ammonia and ammonium salt solution is contacted with the spent catalyst particles at 80° C. to 90° C. for a period of time between 15 minutes and 1 hour. The solution is further characterized by having about equal amounts of ammonia and ammonium ion and has a pH of about 10. The pregnant leach liqour is decanted from the residual catalyst. The residual catalyst will contain between about 40 percent to 60 percent of the cobalt originally on the spent catalyst. The residual catalyst is then leached with a solution containing between 0.1 molar and 5 molar cyanide ion, from a soluble cyanide salt, for example, potassium, sodium or ammonium cyanide. Over 90 percent of the cobalt remaining on the particles is leached by the cyanide.

The cyanide ion is then removed from the aqueous solution of cobalt. Various means well known to the art may be employed for cyanide ion removal. Liquid ion-exchange techniques can be employed or the cyanide ion may be destroyed as for example by oxidation. Cobalt can be separated and purified separately from the pregnant liquor from the cyanide leach or the pregnant liquor from the cyanide leach can be added to the pregnant liquor from the aqueous solution of ammonia and an ammonium salt leach.

DETAILED DESCRIPTION OF THE DRAWINGS

FIG. 1 illustrates an embodiment for recovering metals from spent catalysts known to contain cobalt, nickel, molybdenum and vanadium. The catalyst is first roasted under conditions where the temperature is controlled to less than 600° C. The spent roasted catalyst is then leached by the process of this invention. The pregnant liquor is then extracted with a quaternary amine, forming a first set of two streams: an organic stream containing molybdenum and vanadium, and an aqueous stream containing cobalt and nickel. The first organic stream is stripped with an aqueous solution of ammonium bicarbonate. Hydrochloric acid is added to the aqueous strip solution and ammonium metavanadate is precipitated. The volume of the solution is reduced and ammonium molybdate is precipitated.

Excess ammonia is removed from the first aqueous stream by heating the solution. The solution, which is exposed to air insuring that cobalt is in the trivalent oxidation state, is extracted with LIX 64N ®, removing the nickel and creating a second set of two streams: an aqueous stream containing cobalt and any impurities and an organic stream containing nickel. The second organic solution is stripped with sulfuric acid, forming an acidic nickel containing sulfate solution. The cobalt in the second aqueous stream is reduced over cobalt shot, and extracted with LIX 51 ®, thereby forming a third set of aqueous and organic streams.

The third aqueous stream is recycled to the leach step, enriched in ammonia removed from the ammonia distillation step. The third organic stream is stripped with a solution of ammonia and ammonium carbonate.

FIG. 2 illustrates in detail the method of leaching the hydroprocessing catalyst support of this invention. This is the specific leach used in the leach step of FIG. 1. The spent catalyst is first roasted. The catalyst is then contacted with an aqueous solution of ammonia and an ammonium salt at about 90° C. The recovery of cobalt is followed by some method, for example atomic absorbtion, and when cobalt levels are seen to fall, the ammoniacal leach is stopped and the pregnant liquor is processed further as in FIG. 1. The catalyst support is then leached with an aqueous cyanide solution. The pregnant liquor from this leach is processed for recovery of metals. The catalyst support, now substantially free of catalytic metals, is discarded.

EXAMPLE

Twenty grams of spent hydrodemetalation catalyst which contains nickel, cobalt, vanadium and molybdenum, are roasted between 400° C. and 600° C. The freshly roasted spent catalyst is placed in 100 milliliters of 2 molar ammonia and 1 molar ammonium carbonate. Air is bubbled through the mixture, which is maintained at about 85° C. to 95° C. After 15 minutes, the pregnant liquor is decanted off and 100 milliliters of 1 molar sodium cyanide is added. The solution is maintained at 80° C. for 15 minutes.

The aqueous pregnant liquor from the ammonia and ammonium salt leach contains about 40 percent of the cobalt on the spent catalyst particles, about 70 percent of the nickel, 80 percent of the vanadium, and 90 percent of the molybdenum. The pregnant liquor from the cyanide leach contains about 90 percent of the remaining cobalt.

What is claimed is:

1. A process to leach cobalt from spent catalysts, comprising:
   (a) roasting said spent catalysts at between 400° C. and 600° C.;
   (b) contacting said roasted catalysts with an aqueous ammonia and ammonium salt leach solution forming pregnant liquor and residual catalyst; and
   (c) contacting said residual catalyst with a cyanide ion containing second leach solution forming a second pregnant liquor.

2. The process of claim 1 including removing the cyanide from said second pregnant liquor and combining said first and second pregnant liquors for further processing.

3. The process of claim 1 wherein said aqueous ammonia and ammonium salt solution is at a pH of 10, and contains approximately equal molar amounts of ammonia and ammonium ion.

* * * * *